United States Patent
Morin et al.

(10) Patent No.: US 9,666,848 B2
(45) Date of Patent: May 30, 2017

(54) SINGLE-LAYER LITHIUM ION BATTERY SEPARATOR

(75) Inventors: Brian G. Morin, Greenville, SC (US); James L. Schaeffer, Medford Lakes, NJ (US)

(73) Assignee: Dreamweaver International, Inc., Greer, SC (US)

( * ) Notice: Subject to any disclaimer, the term of this patent is extended or adjusted under 35 U.S.C. 154(b) by 1033 days.

(21) Appl. No.: 13/112,809

(22) Filed: May 20, 2011

(65) Prior Publication Data

US 2012/0295165 A1  Nov. 22, 2012

(51) Int. Cl.

| | |
|---|---|
| *H01M 2/16* | (2006.01) |
| *H01M 10/052* | (2010.01) |
| *H01G 11/52* | (2013.01) |
| *D21H 13/10* | (2006.01) |
| *D21H 15/02* | (2006.01) |
| *D21H 27/00* | (2006.01) |
| *H01M 2/14* | (2006.01) |
| *H01M 2/18* | (2006.01) |

(52) U.S. Cl.
CPC .......... *H01M 2/1613* (2013.01); *D21H 13/10* (2013.01); *D21H 15/02* (2013.01); *D21H 27/00* (2013.01); *H01G 11/52* (2013.01); *H01M 2/145* (2013.01); *H01M 2/162* (2013.01); *H01M 2/1626* (2013.01); *H01M 2/18* (2013.01); *H01M 10/052* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 4,767,687 | A | 8/1988 | LaBonte et al. |
| 4,987,024 | A | 1/1991 | Greenberg et al. |
| 5,075,990 | A | 12/1991 | Greenberg et al. |
| 5,230,949 | A | 7/1993 | Howard et al. |
| 5,290,645 | A | 3/1994 | Tanaka et al. |
| 5,665,265 | A | 9/1997 | Gies et al. |
| 5,888,916 | A | 3/1999 | Tadokoro et al. |
| 5,902,696 | A | 5/1999 | Smesko et al. |
| 5,935,884 | A | 8/1999 | Williams et al. |
| 5,962,161 | A | 10/1999 | Zucker |
| 6,048,641 | A * | 4/2000 | Ohmory et al. ............. 429/142 |

(Continued)

FOREIGN PATENT DOCUMENTS

| | | | |
|---|---|---|---|
| JP | WO 2011033975 A1 * | 3/2011 | ............ H01M 2/145 |
| WO | 0189022 | 11/2001 | |

*Primary Examiner* — Daniel Gatewood
(74) *Attorney, Agent, or Firm* — William S. Parks, PLLC

(57) ABSTRACT

The present invention relates to a microporous polymeric battery separator comprised of a single layer of enmeshed microfibers and nanofibers. Such a separator accords the ability to attune the porosity and pore size to any desired level through a single nonwoven fabric. As a result, the inventive separator permits a high strength material with low porosity and low pore size to levels unattained. The combination of polymeric nanofibers within a polymeric microfiber matrix and/or onto such a substrate through high shear processing provides such benefits, as well. The separator, a battery including such a separator, the method of manufacturing such a separator, and the method of utilizing such a separator within a battery device, are all encompassed within this invention.

20 Claims, 8 Drawing Sheets

(56) References Cited

U.S. PATENT DOCUMENTS

| | | | |
|---|---|---|---|
| 6,057,061 A * | 5/2000 | Callahan et al. | 429/249 |
| 6,108,879 A | 8/2000 | Forte et al. | |
| 6,110,588 A | 8/2000 | Perez et al. | |
| 6,120,939 A | 9/2000 | Whear | |
| 6,291,105 B1 | 9/2001 | Yamamoto et al. | |
| 6,315,806 B1 * | 11/2001 | Torobin et al. | 55/522 |
| 6,432,586 B1 | 8/2002 | Zhang | |
| 6,444,367 B1 | 9/2002 | Kinn et al. | |
| 6,495,292 B1 | 12/2002 | Yen | |
| 6,641,954 B2 | 11/2003 | Weerts et al. | |
| 6,689,509 B2 | 2/2004 | Zucker | |
| 6,692,868 B2 | 2/2004 | Zucker | |
| 6,703,161 B2 | 3/2004 | Zucker | |
| 6,770,401 B1 | 8/2004 | Clough | |
| 6,866,912 B2 | 3/2005 | Higgins et al. | |
| 6,872,311 B2 | 3/2005 | Koslow | |
| 6,905,798 B2 | 6/2005 | Tsukuda et al. | |
| 7,033,704 B2 | 4/2006 | Sato et al. | |
| 7,063,917 B2 | 6/2006 | Kinn et al. | |
| 7,070,884 B2 | 7/2006 | Thompson et al. | |
| 7,074,483 B2 | 7/2006 | Morin | |
| 7,087,343 B2 | 8/2006 | Shi et al. | |
| 7,112,389 B1 | 9/2006 | Arora et al. | |
| 7,170,739 B1 | 1/2007 | Arora et al. | |
| 7,211,322 B2 | 5/2007 | Pekala | |
| 7,238,413 B2 | 7/2007 | Edwards et al. | |
| 7,279,251 B1 | 10/2007 | Yun et al. | |
| 7,402,539 B2 | 7/2008 | Takase et al. | |
| 7,591,883 B2 | 9/2009 | Kameoka et al. | |
| 7,717,975 B2 | 5/2010 | Kalayci et al. | |
| 7,754,123 B2 | 7/2010 | Verdegan et al. | |
| 7,789,930 B2 | 9/2010 | Ensor et al. | |
| 7,790,320 B2 * | 9/2010 | Arora et al. | 429/247 |
| 7,790,321 B2 | 9/2010 | Hennige et al. | |
| 7,918,913 B2 * | 4/2011 | Kalayci et al. | 55/486 |
| 7,923,143 B2 | 4/2011 | Tanaka et al. | |
| 7,981,818 B2 | 7/2011 | Justice | |
| 8,470,898 B2 | 6/2013 | Huang et al. | |
| 8,477,748 B2 | 7/2013 | Shinozaki | |
| 8,557,444 B2 | 10/2013 | Arora et al. | |
| 8,697,587 B2 | 4/2014 | Arora et al. | |
| 2003/0113619 A1 | 6/2003 | Zucker | |
| 2003/0180622 A1 | 9/2003 | Tsukuda et al. | |
| 2004/0222552 A1 | 11/2004 | Housler et al. | |
| 2005/0014063 A1 | 1/2005 | Shi et al. | |
| 2006/0154140 A1 | 7/2006 | Yamamoto et al. | |
| 2006/0188786 A1 | 8/2006 | Lee et al. | |
| 2007/0196638 A1 * | 8/2007 | Wei et al. | 428/304.4 |
| 2008/0070463 A1 | 3/2008 | Arora et al. | |
| 2008/0182167 A1 | 7/2008 | Kritzer | |
| 2008/0241459 A1 | 10/2008 | Higgins et al. | |
| 2009/0261035 A1 | 10/2009 | Arora et al. | |
| 2009/0324925 A1 | 12/2009 | Conley et al. | |
| 2010/0092853 A1 | 4/2010 | Ito et al. | |
| 2010/0136865 A1 | 6/2010 | Bletsos et al. | |
| 2010/0173156 A1 | 7/2010 | Morin | |
| 2010/0195270 A1 | 8/2010 | Hayakawa et al. | |
| 2010/0229516 A1 | 9/2010 | Fox et al. | |
| 2010/0310921 A1 | 12/2010 | Hayakawa et al. | |
| 2011/0079553 A1 | 4/2011 | Thomson et al. | |
| 2011/0117439 A1 | 5/2011 | Yamada et al. | |
| 2011/0143207 A1 | 6/2011 | Arora et al. | |
| 2011/0143217 A1 | 6/2011 | Arora et al. | |
| 2011/0165459 A1 | 7/2011 | Halalay et al. | |
| 2011/0171523 A1 | 7/2011 | Samii et al. | |
| 2011/0171535 A1 | 7/2011 | Ohinshi et al. | |
| 2011/0217538 A1 | 9/2011 | Miura et al. | |
| 2011/0217539 A1 | 9/2011 | Bonner et al. | |
| 2011/0229750 A1 | 9/2011 | McLellan et al. | |
| 2011/0262817 A1 | 10/2011 | Tanaka et al. | |
| 2012/0003524 A1 | 1/2012 | Jo et al. | |
| 2012/0028086 A1 | 2/2012 | Shi et al. | |
| 2012/0122011 A1 | 5/2012 | Zou et al. | |
| 2012/0164514 A1 * | 6/2012 | Hayakawa | H01M 2/145 429/144 |
| 2012/0177976 A1 | 7/2012 | Wensley et al. | |
| 2012/0183862 A1 | 7/2012 | Gupta et al. | |
| 2013/0017431 A1 | 1/2013 | Frisk et al. | |
| 2013/0065052 A1 | 3/2013 | Morin | |
| 2013/0065133 A1 | 3/2013 | Suzuki et al. | |
| 2013/0078525 A1 | 3/2013 | Morin et al. | |
| 2013/0164629 A1 | 6/2013 | Hou et al. | |
| 2014/0134496 A1 | 5/2014 | Morin | |
| 2014/0141336 A1 | 5/2014 | Morin | |
| 2014/0141337 A1 | 5/2014 | Morin | |

\* cited by examiner

SINGLE-LAYER LITHIUM ION BATTERY SEPARATOR

FIELD OF THE INVENTION

The present invention relates to an insulating (nonconductive) microporous polymeric battery separator comprised of a single layer of enmeshed microfibers and nanofibers. Such a separator accords the ability to attune the porosity and pore size to any desired level through a single nonwoven fabric. As a result, the inventive separator permits a high strength material with low porosity and low pore size to levels unattained. The combination of polymeric nanofibers within a polymeric microfiber matrix and/or onto such a substrate through high shear processing provides such benefits, as well. The separator, a battery including such a separator, the method of manufacturing such a separator, and the method of utilizing such a separator within a battery device, are all encompassed within this invention.

BACKGROUND OF THE INVENTION

Batteries have been utilized for many years as electrical power generators in remote locations. Through the controlled movement of electrolytes (ions) between electrodes (anode and cathode), a power circuit is generated, thereby providing a source of electricity that can be utilized until the electrolyte source is depleted and no further electrical generation is possible. In more recent years, rechargeable batteries have been created to allow for longer lifetimes for such remote power sources, albeit through the need for connecting such batteries to other electrical sources for a certain period of time. All in all, however, the capability of reusing such a battery has led to greater potentials for use, particularly through cell phone and laptop computer usage and, even more so, to the possibility of automobiles that solely require electricity to function.

Such batteries typically include at least five distinct components. A case (or container) houses everything in a secure and reliable manner to prevent leakage to the outside as well as environmental exposure inside. Within the case are an anode and a cathode, separated effectively by a separator, as well as an electrolyte solution (low viscosity liquid) that transport over and/or through the separator between the anode and cathode. The rechargeable batteries of today and, presumably tomorrow, will run the gamut of rather small and portable devices, but with a great deal of electrical generation potential in order to remain effective for long periods between charging episodes, to very large types present within automobiles, as an example, that include large electrodes (at least in surface area) that must not contact one another and large amounts of electrolytes that must consistently and constantly pass through a membrane to complete the necessary circuit, all at a level of power generation conducive to providing sufficient electricity to run an automobile engine. As such, the capability and versatility of battery separators in the future must meet certain requirements that have yet to be provided within the current industry.

Generally speaking, battery separators have been utilized since the advent of closed-cell batteries to provide necessary protection from unwanted contact between electrodes as well as to permit effective transport of electrolytes within power generating cells. Typically, such materials have been of film structure, sufficiently thin to reduce the weight and volume of a battery device while imparting the necessary properties noted above at the same time. Such separators must exhibit other characteristics, as well, to allow for proper battery function. These include chemical stability, suitable porosity of ionic species, effective pore size for electrolyte transfer, proper permeability, effective mechanical strength, and the capability of retaining dimensional and functional stability when exposed to high temperatures (as well as the potential for shutdown if the temperature rises to an abnormally high level).

In greater detail, then, the separator material must be of sufficient strength and constitution to withstand a number of different scenarios. Initially, the separator must not suffer tears or punctures during the stresses of battery assembly. In this manner, the overall mechanical strength of the separator is extremely important, particularly as high tensile strength material in both the machine and cross (i.e., transverse) directions allows the manufacturer to handle such a separator more easily and without stringent guidelines lest the separator suffer structural failure or loss during such a critical procedure. Additionally, from a chemical perspective, the separator must withstand the oxidative and reductive environment within the battery itself, particularly when fully charged. Any failure during use, specifically in terms of structural integrity permitting abnormally high amounts of electrolyte to pass or for the electrodes to touch, would destroy the power generation capability and render the battery totally ineffective. Thus, even above the ability to weather chemical exposure, such a separator must also not lose dimensional stability (i.e., warp or melt) or mechanical strength during storage, manufacture, and use, either, for the same reasons noted above.

Simultaneously, however, the separator must be of proper thickness to, in essence, facilitate the high energy and power densities of the battery, itself. A uniform thickness is quite important, too, in order to allow for a long life cycle as any uneven wear on the separator will be the weak link in terms of proper electrolyte passage, as well as electrode contact prevention.

Additionally, such a separator must exhibit proper porosity and pore sizes to accord, again, the proper transport of ions through such a membrane (as well as proper capacity to retain a certain amount of liquid electrolyte to facilitate such ion transfer during use.) The pores themselves should be sufficiently small to prevent electrode components from entering and/or passing through the membrane, while also allowing, again, as noted above, for the proper rate of transfer of electrolyte ions. As well, uniformity in pore sizes, as well as pore size distribution, provides a more uniform result in power generation over time as well as more reliable long-term stability for the overall battery as, as discussed previously, uniform wear on the battery separator, at least as best controlled in such a system, allows for longer life-cycles. It additionally can be advantageous to ensure the pores therein may properly close upon exposure to abnormally high temperatures to prevent excessive and undesirable ion transfer upon such a battery failure (i.e., to prevent fires and other like hazards).

As well, the pore sizes and distributions may increase or decrease the air resistance of the separator, thus allowing for simple measurements of the separator that indicate the ability of the separator to allow adequate passage of the electrolyte present within the battery itself. For instance, mean flow pore size can be measured according to ASTM E-1294, and this measurement can be used to help determine the barrier properties of the separator. Thus, with low pore size, the rigidity of the pores themselves (i.e., the ability of the pores to remain a certain size during use over time and upon exposure to a set pressure) allows for effective control of electrode separation as well. More importantly, perhaps, is the capability of such pore size levels to limit electrolyte permeability in order to reduce the chances of crystal formation on an anode (such a lithium crystals on a graphite anode) that would impair the generation of the necessary circuit and deleteriously impact the power generation capability of the battery over time.

Furthermore, the separator must not impair the ability of the electrolyte to completely fill the entire cell during manufacture, storage and use. Thus, the separator must exhibit proper wicking and/or wettability during such phases in order to ensure the electrolyte in fact may properly generate and transfer ions through the membrane; if the separator were not conducive to such a situation, then the electrolyte would not properly reside on and in the separator pores and the necessary ion transmission would not readily occur, at least in theory.

The general aim of an effective battery separator, then, is to provide low air resistance and, simultaneously, very low pore size, in order to accord a material that drastically reduces any potential for electrode contact, but with the capability of controlled electrolyte transport from one portion of the battery cell to the other (i.e., closing the circuit to generate the needed electrical power). Currently, such properties are not effectively provided in tandem. For instance, Celgard has disclosed and marketed an expanded film battery separator with very low pore size, which is very good in that respect, as noted above; however, the corresponding air resistance for such a material is extremely high, thus limiting the overall effectiveness of such a separator. To the contrary, duPont commercializes a nanofiber nonwoven membrane separator that provides very low air resistance, but with overly large pore sizes therein. Additionally, the overall mechanical strengths exhibiting by these two materials are very limiting; the Celgard separator has excellent strength in the machine direction, but nearly zero strength in the cross (transverse) direction. Such low cross direction strength requires very delicate handling during manufacture, at least, as alluded to above. The duPont materials fare a little better, except that the strengths are rather low in both directions, albeit with a cross direction that is higher than the Celgard material. In actuality, the duPont product is closer to an isotropic material (nearly the same strengths in both machine and cross directions), thus providing a more reliable material in terms of handling than the Celgard type. However, the measured tensile strengths of the duPont separator are quite low in effect, thus relegating the user to carefully maneuvering and placing such materials during manufacture as well. Likewise, the dimensional stability of such prior battery separators are highly suspect due to these tensile strength issues, potentially leading to materials that undesirably lose their structural integrity over time when present within a rechargeable battery cell.

Thus, there still exists a need to provide a battery separator that provides simultaneously low air resistance and low pore size, as well as high tensile strength overall and at relatively isotropic levels, all while exhibiting proper chemical stability, structural integrity, dimensional stability, and ease in manufacture. Additionally, a manner of producing battery separators that allows for achieving targeted property levels (such as a specific range of pore sizes and/or a specific range of air resistance measurements) through minor modifications in manufacturing would permit greater versatility to meet battery manufacturer requirements on demand; currently, such a manufacturing method to such an extent has yet to be explored throughout the battery separator industry. As such, an effective and rather simple and straightforward battery separator manufacturing method in terms of providing any number of membranes exhibiting such versatile end results (i.e., targeted porosity and air resistance levels through processing modifications on demand) as well as necessary levels of mechanical properties, heat resistance, permeability, dimensional stability, shutdown properties, and meltdown properties, is prized within the rechargeable battery separator industry; to date, such a material has been unavailable.

ADVANTAGES AND SUMMARY OF THE INVENTION

A distinct advantage of the present invention is the ease in manufacturing through a wetlaid nonwoven fabrication process. Another distinct advantage is the resulting capability of providing any targeted level of pore size, porosity, and air resistance, through the mere change in proportions of component fibers utilized during the fabrication process. Yet another advantage of this inventive battery separator is the isotropic strength properties accorded the user for reliability in long-term use as well as during the battery manufacturing phase. The ability of the inventive separator to provide contemporaneous low air resistance and low pore sizes is still a further advantage of this invention. Yet another advantage of this inventive battery separator is the provision of a specifically non-conductive (and thus insulating) fabric that does not allow transmission of electrical charge through the separator body, but solely through the transport of charged ions through the pores present within its structure. Yet another advantage is the high porosity of the material, allowing more electrolyte to flow and increasing the durability of the ability to hold energy over many life cycles by allowing fully recharged electrodes.

Accordingly, this invention pertains to an insulating polymeric battery separator comprising a nonwoven combination of microfibers and nanofibers, wherein said separator provides sufficient porosity for electrolyte ion transfer therethrough and suitable prevention of electrode contact through a single layer of said nonwoven combination. A battery including such an insulating separator is likewise encompassed within this invention, as is the method of utilizing such a battery to generate electricity in a rechargeable device. Furthermore, a method of manufacturing an insulating polymeric battery separator through a wetlaid nowoven fabricating method wherein a plurality of polymeric microfibers of at least one polymeric component or a plurality of polymeric nanofiber of at least one polymeric component, or both of said plurality of polymeric microfibers and nanofibers, is combined in a high shear environment to form a slurry of a plurality of fibrillated polymeric microfibers and a plurality of nanofibers to form a single-layer fabric therefrom, is also included within this invention.

Throughout this disclosure, the term microfiber is intended to mean any polymeric fiber exhibiting a width that is measured in micrometers, generally having a fiber diameter greater than 1000 nm, but also greater than 3000 nm, or even greater than 5000 nm or possibly even greater than 10,000 nm, up to about 40 microns. As well, the term nanofiber is intended to mean any polymeric fiber exhibiting a width that is measured in nanometers, generally having a diameter less than 1000 nm, but possibly less than 700 nm, or even less than 500 nm or possibly even less than 300 nm (as low as about 1 nm). As well, the term insulating in intended to indicate no appreciable degree of electrical conductivity, and thus the inventive fabric structure does not permit electrical charge throughout the fabric body, but only through the passage of electrolytic ions through the pores present therein.

Such a combination of microfibers and nanofibers has yet to be investigated within the battery separator art, particularly in terms of the capability of providing a single-layer nonwoven fabric of the two base components for such a purpose. The microfiber constituent may be of any suitable polymer that provides the necessary chemical and heat resistance alluded to above, as well as the capability of forming a microfiber structure. As well, such a microfiber may also be fibrillated (or treated in any other like manner, such as through plasma exposure, and the like) during or subsequent to fiber formation in order to increase the surface area thereof to facilitate the desired entangling between a plurality of such microfibers during a nonwoven fabrication process. Such polymeric components may thus include acrylics such as polyacrylonitrile, polyolefins such as polypropylene, polyethylene, polybutylene and others including copolymers, polyamides, polyvinyl alcohol, polyethylene terephthalate, polybutylene terephthalate, polysulfone, polyvinyl fluoride, polyvinylidene fluoride, polyvinylidene fluoride-hexafluoropropylene, polymethyl pentene, polyphenylene sulfide, polyacetyl, polyurethane, aromatic polyamide, semi-aromatic polyamide, polypropylene terephthalate, polymethyl methacrylate, polystyrene, and blends, mixtures and copolymers including these polymers. Polyacrylates, polyesters, and polyolefins are potentially preferred.

The fibers may also be pre-treated with adhesives to effectuate the desired degree of contact and dimensional stability of the overall nonwoven structure subsequent to fabrication. The nanofibers may thus be of any like polymer constituency in order to withstand the same types of chemical and high temperature exposures as for the microfibers. Due to their size, there is no requirement of post-manufacture treatment of such nanofiber materials to accord any increase in entanglement on the produced nonwoven surface or within the interstices thereof. Importantly, however, is the necessity that the nanofibers combine with the microfibers under a sufficiently high shear environment to accord the desired introduction of such nanofibers onto and within the resultant microfiber nonwoven substrate simultaneously during actual nonwoven fabrication itself. In other words, upon the provision of both types of fiber materials within the nonwoven production process, the manufacturer should accord a sufficient amount of mixing and high shear conditions to best ensure the proper degree of entanglement between the different fiber types to form the desired single-layer fabric structure. As well, the fabrication method is potentially preferred as a wetlaid nonwoven procedure in addition to the high shear type, ostensibly to best ensure the proper introduction and residual location of nanofibers within the microfiber interstices. With an increased water flow during manufacture, the extremely small nanofibers will be drawn into such interstices at a greater rate than with a dry entanglement method, thereby according the aforementioned interstice fill capability. The resultant nonwoven structure would thus exhibit greater uniformity in terms of thickness, porosity, and, most importantly, pore sizes, therein.

One method followed for such a wetlaid procedure includes the provision of pre-fibrillated microfibers in a pulp-like formulation, comprising, for example, up to about 80% by weight of an aqueous-based formulation (water alone is preferred, although other solvents that permit a wetlaid process and subsequent facilitation of evaporation thereof may be utilized, including, for instance, certain non-polar alcohols). The pre-fibrillated microfibers have been treated in such a manner, thus exhibiting a certain amount of already-present nanofibers (the residual product removed from the microfiber themselves during fibrillation, but not removed from the overall resultant mesh of microfibers thereafter). Such pre-fibrillated fibers are in pulp form as a result of the fibrillation procedure, rendering a slurry-like formulation including the above-noted aqueous-based solvent with the resultant pre-fibrillated microfibers and nanofibers. This slurry-like formulation is then mixed with selected amounts of other microfibers and/or nanofibers (preferably in pulp- or slurry-like form, as well), and the resultant formulation, having a very low concentration of actual fiber solids content therein (i.e., above 90% by weight of water or other aqueous-based solvent) is then subjected to a high shear environment with subsequent placement on a flat surface. The surface is sufficiently porous to allow for solvent elution, thus leaving the desired wetlaid nonwoven single fabric layer including fibrillated microfibers entangled with one another, and exhibiting interstices between each microfiber, as well as nanofibers present within such interstices and on the surface of the larger microfibers as well. The amount of added nanofibers to the pre-fibrillated microfiber pulp would thus accord greater amounts of fill between the microfiber interstices to provide an overall low mean pore size, particularly in comparison to a wetlaid nonwoven that is made solely from the pre-fibrillated pulp alone. Conversely, then, the addition of microfibers to the pre-fibrillated fiber slurry would accord a larger mean pore size to the resultant wetlaid nonwoven single layer fabric than the pre-fibrillated fiber slurry alone. This capability to target different mean pore sizes through nanofiber and/or microfiber addition levels accords the manufacturer the potential to achieve any desired mean pore size level. As well, the potential to calendar and otherwise alter the thickness of the resultant single layer fabric permits the manufacturer the further capability to allow for greater versatility in terms of both air resistance and mean pore size measurements. Such a dial-in process has yet to be explored within the battery separator industry.

Other methods of nonwoven sheet manufacture which enable the entanglement of a combination of nanofibers and microfibers may also be used to create the inventive battery separators. One method would be to start with distinct nanofibers and microfibers and combine them in the method described above. Other such methods include carding, cross lapping, hydroentangling, air laid, needlepunch, or other methods that enable the microfibers to form an entangled mesh and the nanofibers to fill the interstices between said microfibers.

In effect, as noted above, the microfiber interstices form the "pores" per se, and the nanofibers fill in such openings to reduce the sizes therein, and to a substantially uniform degree over the entire nonwoven structure. Of highly unexpected benefit to the overall invention, particularly in terms of targeting different levels of porosity on demand, is the ability to dial in pore sizes within the resultant nonwoven structure through the mere modification of the concentration of microfibers to nanofibers alone. Thus, for example, a 70% microfiber to 30% nanofiber proportion at the nonwoven fabrication process outset would provide a pore size in the range of L to M, whereas a 60% microfiber/40% nanofiber combination would provide an effectively smaller pore size distribution (as well as a more uniform range thereof). Such an unforeseen result thus accords an on-demand porosity result for the end user through, as noted, as rather simple manufacturing modification. Such pore sizes created can be measured, resulting in a mean flow pore size. Such mean flow pore sizes may be less than 2000 nm, even less than 1000 nm, preferably less than 700 nm, more preferably less than 500 nm.

Additionally, however, the manufacturer has other manners of controlling the desired properties of the inventive battery separators through the capability of providing different thicknesses of the single-layer structure on demand as well. Such a thickness characteristic may be provided through the initial wetlaid fabrication method process parameters alone, or the manufacturer may subsequently calendar the resultant fabric to any desired thickness. Such thickness may be less than 250 micrometers, preferably less than 100 micrometers, more preferably less than 50 micrometers, even more preferably less than 35 micrometers, most preferably less than 25 micrometers. As noted above, the capability of preventing contact between the anode and cathode of the battery is necessary to prevent a shorted circuit during battery use; the thickness of the separator and the controlled pore size therein provide the essential manner of achieving such a result. However, battery separator thickness may also contribute to the available volume of other component parts within the closed battery cell as well as the amount of electrolyte solution provided therein. The entirety of the circumstances involved thus require an effective separator in terms of multiple variables. The beneficial ease of manufacture as well as the capability of providing effective on-demand pore size and air resistance properties through the inventive manufacturing method and the resultant single-layer battery separator made therefrom thus sets this development distinctly apart from the state of the art battery separators currently used and marketed today.

Additionally, it should be noted that although a single-layer separator including microfibers and nanofibers together is encompassed within this invention, the utilization of multiple layers of such a fabric structure, or of a single layer of such an inventive battery separator fabric with at least one other layer of a different type of fabric, may be employed and still within the scope of the overall invention described herein.

Such battery separators as described herein are clearly useful for improving the art of primary and rechargeable batteries, but also may be used for other forms of electrolyte conducting energy storage techniques, such as capacitors, supercapacitors and ultracapacitors. Indeed, the control allowed on the pore size for such inventive separators may allow significant improvements in the energy loss, power discharge rate, and other properties of these devices.

DETAILED DESCRIPTION OF THE DRAWINGS AND PREFERRED EMBODIMENTS

Figure 1:
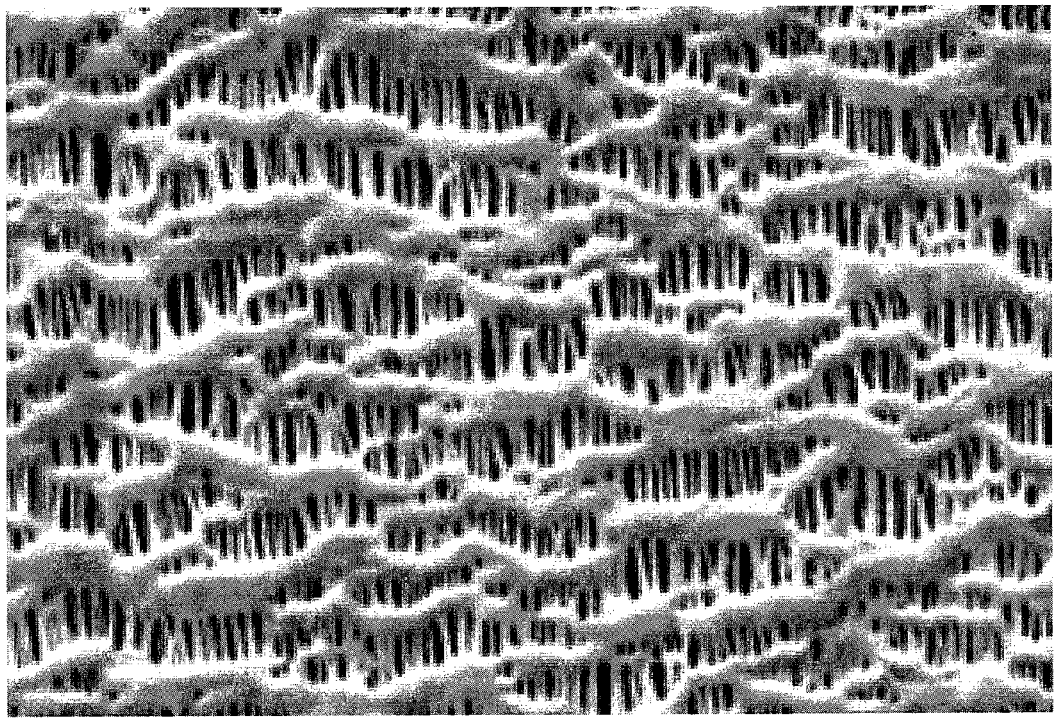
FIG. 1 is an SEM microphotograph of a prior art expanded film battery separator.

All the features of this invention and its preferred embodiments will be described in full detail in connection with the following illustrative, but not limiting, drawings and examples.

Microfiber and Nanofiber Production

As noted above, the microfiber may be constructed from any polymer (or polymer blend) that accords suitable chemical and heat resistance in conjunction with internal battery cell conditions, as well as the capability to form suitable fiber structures within the ranges indicated, and further the potential to be treated through a fibrillation or like technique to increase the surface area of the fibers themselves for entanglement facilitation during nonwoven fabrication. Such fibers may be made from longstanding fiber manufacturing methods such as melt spinning, wet spinning, solution spinning, melt blowing and others. In addition, such fibers may begin as bicomponent fibers and have their size and/or shape reduced or changed through further processing, such as splittable pie fibers, islands-in-the-sea fibers and others. Such fibers may be cut to an appropriate length for further processing, such lengths may be less than 1 inch, or less than ½ inch, or less than ¼ inch even. Such fibers may also be fibrillated into smaller fibers or fibers that advantageously form wetlaid nonwoven fabrics.

Nanofibers for use in the current invention may be made through several longstanding techniques, such as islands-in-the-sea, centrifugal spinning, electrospinning, film or fiber fibrillation, and the like. Teijin and Hills both market potentially preferred islands-in-the-sea nanofibers (Teijin's is marketed as NanoFront fiber polyethylene terephthalate fibers with a diameter of 70 nm). Dienes and FiberRio are both marketing equipment which would provide nanofibers using the centrifugal spinning technique. Electrospinning nanofiber production is practiced by duPont, E-Spin Technologies, or on equipment marketed for this purpose by Elmarco. Nanofibers fibrillated from films are disclosed in U.S. Pat. Nos. 6,110,588, 6,432,347 and 6,432,532, which are incorporated herein in their entirety by reference. Nanofibers fibrillated from other fibers may be done so under high shear, abrasive treatment. Nanofibers made from fibrillated cellulose and acrylic fibers are marketed by Engineered Fiber Technologies under the brand name EFTEC™. Any such nanofibers may also be further processed through cutting and high shear slurry processing to separate the fibers an enable them for wet laid nonwoven processing. Such high shear processing may or may not occur in the presence of the required microfibers.

Nanofibers that are made from fibrillation in general have a transverse aspect ratio that is different from one, such transverse aspect ratio described in full in U.S. Pat. No. 6,110,588, which is incorporated herein by reference. As such, in one preferred embodiment, the nanofibers have a transverse aspect ratio of greater than 1.5:1, preferably greater than 3.0:1, more preferably greater than 5.0:1.

As such, acrylic, polyester, and polyolefin fibers are particularly preferred for such a purpose, with fibrillated acrylic fibers, potentially most preferred. Again, however, this is provided solely as an indication of a potentially preferred type of polymer for this purpose and is not intended to limit the scope of possible polymeric materials or polymeric blends for such a purpose.

Figure 2:
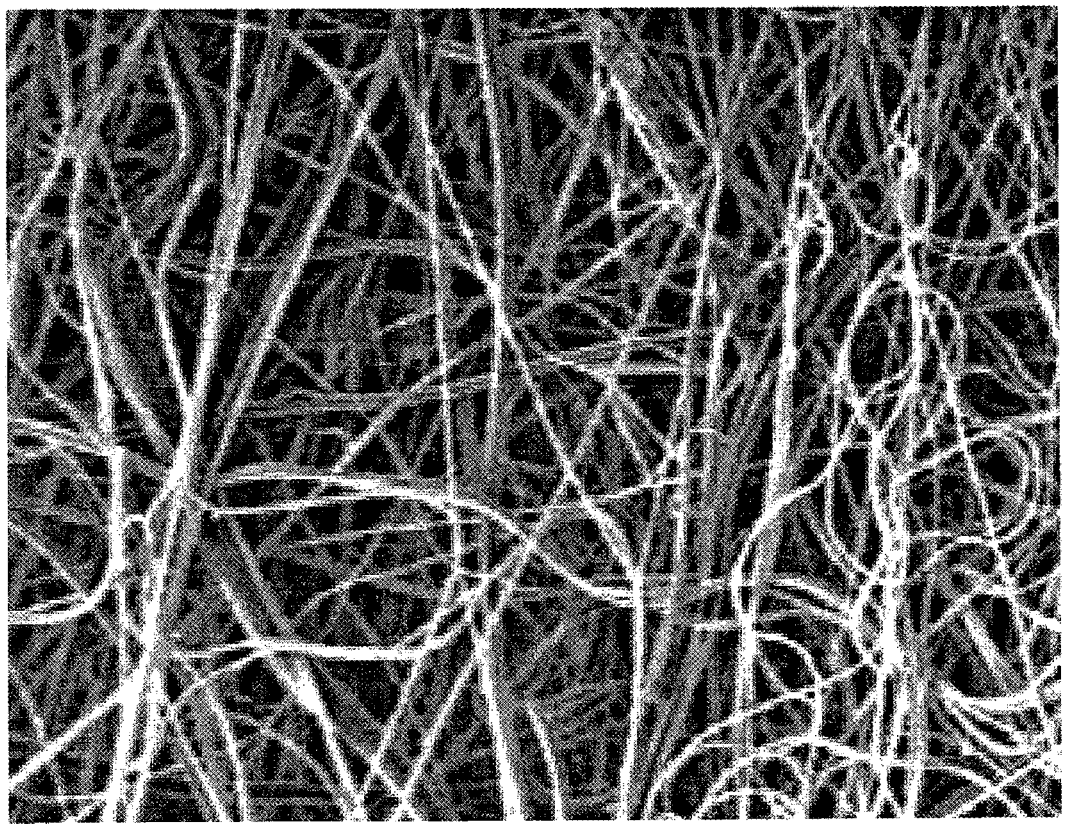
FIG. 2 is an SEM microphotograph of a prior art nanofiber nonwoven fabric battery separator.

FIGS. 1 and 2 provide photomicrographs of the typical structures of the Celgard expanded film materials and the duPont nanofiber nonwoven battery separator materials, respectively, and as discussed above. Noticeably, the film structure of the Celgard separator shows similarity in pore sizes, all apparently formed through film extrusion and resultant surface disruptions in a rather uniform format. The duPont separator is made strictly from nanofibers alone as the uniformity in fiber size and diameter is evident. Being a nonwoven structure of such nanofibers themselves, the overall tensile strengths of this separator in both machine and cross directions are very low, although roughly uniform in both directions. Thus, such a material may be handled uniformly, as a result, although overall strength lends itself to other difficulties a manufacturer must face, ultimately, if introducing such a separator into a battery cell. To the contrary, then, the FIG. 1 separator, showing the striations for pore generation in the same direction (and thus extrusion of the film in one direction), provides extremely high machine direction tensile strength; unfortunately, the tensile strength of the same material in the cross direction is very close to nonexistent, leaving, as discussed previously, a very difficult and highly suspect battery separator material to actually utilize in a battery manufacturing setting.

Figure 3:
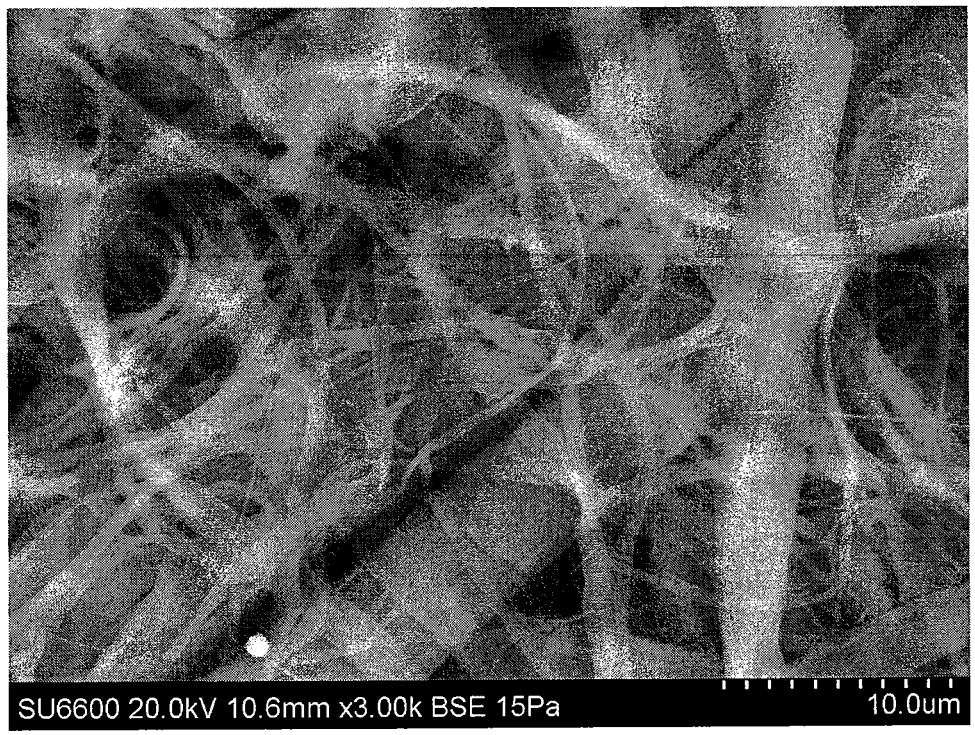
FIG. 3 is an SEM microphotograph provided at 3,000× of one potentially preferred embodiment of an inventive microfiber/nanofiber nonwoven fabric battery separator structure.
Figure 4:
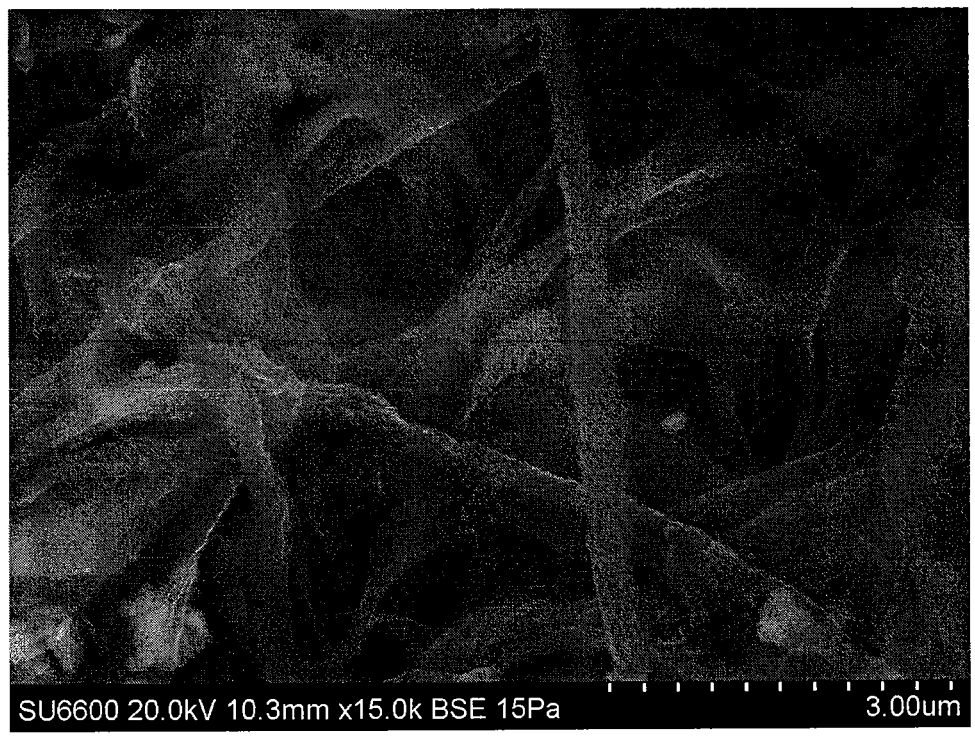
FIG. 4 is an SEM microphotograph provided at 15,000× of one potentially preferred embodiment of an inventive microfiber/nanofiber nonwoven fabric battery separator structure.
Figure 5:
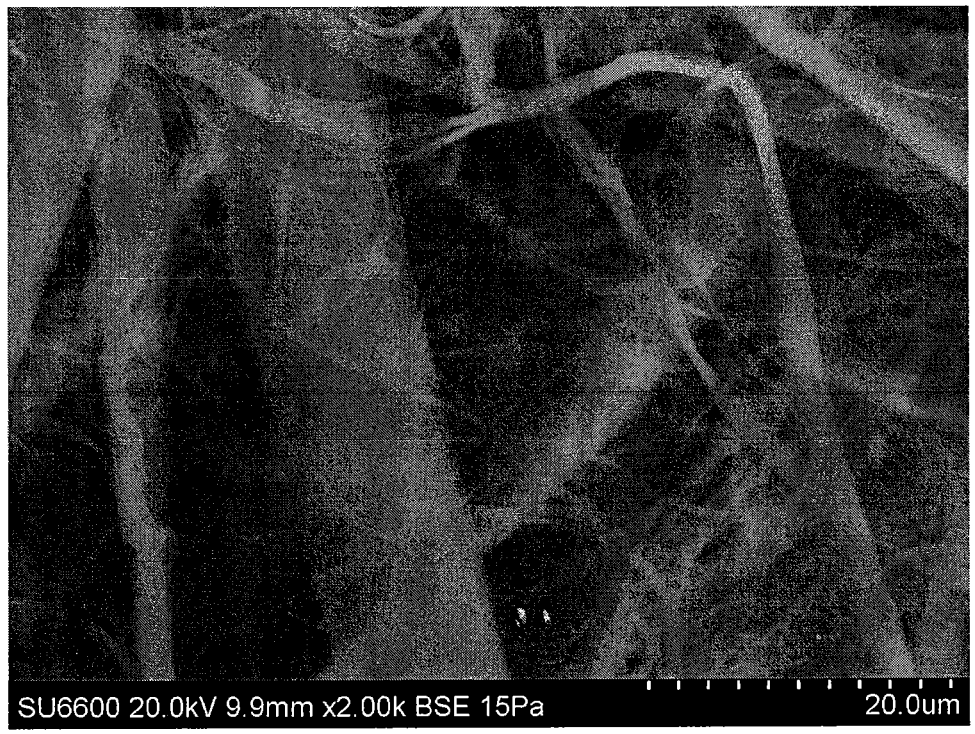
FIG. 5 is an SEM microphotograph provided at 2,000× of another potentially preferred embodiment of an inventive microfiber/nanofiber nonwoven fabric battery separator structure.
Figure 6:
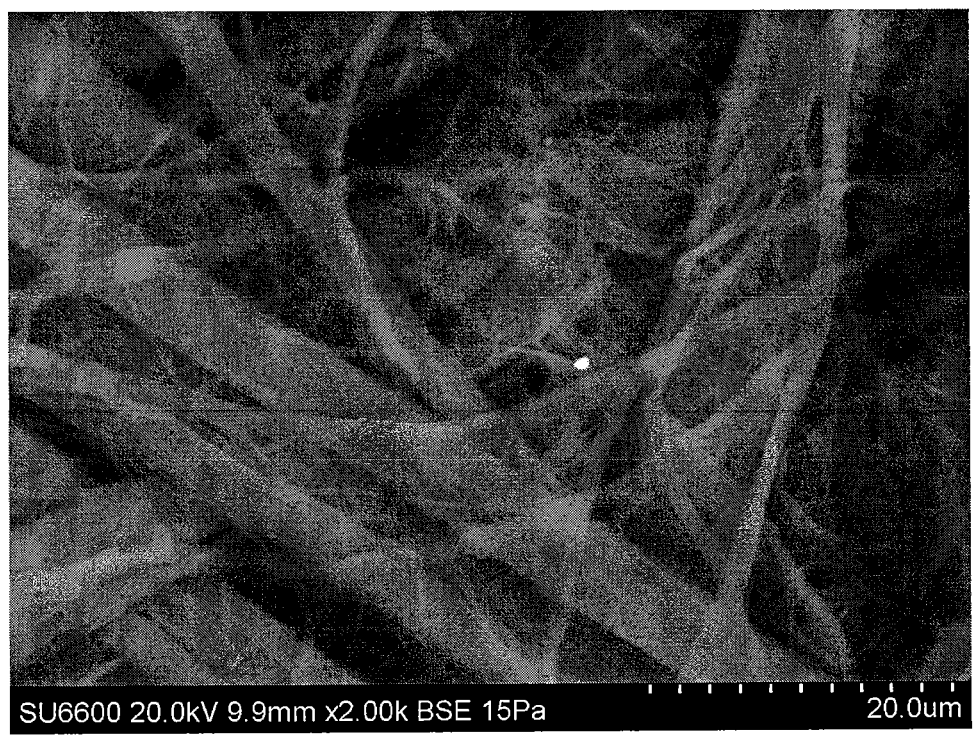
FIG. 6 is an SEM microphotograph provided at 2,000× of another potentially preferred embodiment of an inventive microfiber/nanofiber nonwoven fabric battery separator structure.
Figure 7:
FIG. 7 is an SEM microphotograph provided at 2,000× of another potentially preferred embodiment of an inventive microfiber/nanofiber nonwoven fabric battery separator structure.

The inventive materials, shown in photomicrograph form in FIGS. 3 and 4, are of totally different structure from these two prior art products. One potentially preferred embodiment of the initial combination of microfiber and nanofibers includes EFTEC™ A-010-4 fibrillated polyacrylonitrile fibers, which have high populations of nanofibers as well as microfibers (such fibers and fabrics made therefrom have never been utilized as battery separator materials in the past). The resultant nanofibers present within such a combination are residual as a result of the fibrillation of the initial microfibers. Nonwoven sheets made of these materials are shown in FIGS. 3 and 4. By way of example, these fibers can be used as a base material, to which can be added further microfibers or further nanofibers as a way of controlling the pore size and other properties of the nonwoven fabric, or such a material may be utilized as the nonwoven fabric battery separator itself. Examples of such sheets with additional microfibers added are shown in FIGS. 5, 6 and 7. Typical properties of the acrylic Micro/Nanofibers are shown below.

TABLE 1

| Acrylic Micro/Nanofiber Properties | |
|---|---|
| Density, g/cm$^3$ | 1.17 |
| Tensile Strength, MPa | 450 |
| Modulus, GPa | 6.0 |
| Elongation, % | 15 |
| Typical Fiber Length, mm | 4.5-6.5 |
| Canadian Standard Freeness, ml | 10-700 |
| BET Surface Area, m$^2$/g | 50 |
| Moisture Regain, % | <2.0 |
| Surface Charge | Anionic |

Such fibers are actually present, as discussed above, in a pulp-like formulation, thereby facilitating introduction within a wetlaid nonwoven fabric production scheme.

Nonwoven Production Method

Material combinations were then measured out to provide differing concentrations of both components prior to introduction together into a wetlaid manufacturing process. Handsheets were made according to TAPPI Test Method T-205, which is incorporated here by reference (basically, as described above, mixing together in a very high aqueous solvent concentration formulation and under high shear conditions as are typically used in wet laid manufacturing and described as "refining" of fibers, ultimately laying the wet structure on a flat surface to allow for solvent evaporation). Several different combinations were produced to form final nonwoven fabric structures. The method was adjusted only to accommodate different basis weights by adjusting the initial amount of material incorporated into each sheet. Materials and ratios are shown in Table 2.

FIGS. 5, 6, and 7 correlate in structure to Example 3 below, as well. The similarity in structure (larger microfibers and smaller nanofibers) are clarified, and the presence of fewer amounts of nanofibers in these structures is evident from these photomicrographs, as well.

The fabric was measured for thickness and then cut into suitable sizes and shapes for introduction within lithium ion rechargeable battery cells. Prior to any such introduction, however, samples of the battery separator fabrics were analyzed and tested for various properties in relation to their capability as suitable battery separators. Furthermore, comparative examples of battery separator nanofiber membranes according to U.S. Pat. No. 7,112,389, which is hereby incorporated by reference, as well as battery separator films from Celgard, are reported from the tests in the patent and from Celgard product literature.

EXAMPLES

Examples 1-21 were made according to TAPPI Test Method T205 using Engineered Fiber Technologies EFTEC™ A-010-04 fibrillated acrylic fiber (combination of microfiber and nanofiber) (listed as Base Fabric) and FiberVisions T426 fiber, which is 2 denier per filament, cut to 5 mm length, and a bicomponent fiber made from polypropylene and polyethylene, and has a diameter of approximately 17 microns (listed as Added Fiber). The amount of each fiber, conditioned basis weight, caliper (or thickness), apparent density and porosity of the examples are shown in Table 2. Conditioned Basis Weight, Caliper, Apparent Density, and Tensile were tested according to TAPPI T220, which is hereby incorporated by reference.

TABLE 2

Separator Materials Production

| Example | % Base Fabric | % Added Fiber | Conditioned Basis Wt g/m$^2$ | Caliper mm | Apparent Density g/cm$^3$ | Porosity % |
|---|---|---|---|---|---|---|
| 1 | 100% | 0% | 62.4 | 0.141 | 0.442 | 68% |
| 2 | 70% | 30% | 61.5 | 0.197 | 0.312 | 75% |
| 3 | 50% | 50% | 66.3 | 0.244 | 0.272 | 76% |
| 4 | 30% | 70% | 61.2 | 0.256 | 0.239 | 77% |
| 5 | 20% | 80% | 64.0 | 0.288 | 0.222 | 78% |
| 6 | 100% | 0% | 30.0 | 0.079 | 0.380 | 73% |
| 7 | 90% | 10% | 32.1 | 0.096 | 0.334 | 75% |
| 8 | 80% | 20% | 31.4 | 0.103 | 0.305 | 77% |
| 9 | 70% | 30% | 30.6 | 0.109 | 0.280 | 78% |

TABLE 2-continued

Separator Materials Production

| Example | % Base Fabric | % Added Fiber | Conditioned Basis Wt g/m² | Caliper mm | Apparent Density g/cm³ | Porosity % |
|---|---|---|---|---|---|---|
| 10 | 60% | 40% | 30.5 | 0.118 | 0.259 | 79% |
| 11 | 50% | 50% | 30.2 | 0.135 | 0.223 | 81% |
| 12 | 100% | 0% | 42.2 | 0.103 | 0.409 | 71% |
| 13 | 90% | 10% | 41.8 | 0.119 | 0.352 | 74% |
| 14 | 80% | 20% | 42.3 | 0.131 | 0.323 | 75% |
| 15 | 70% | 30% | 41.8 | 0.145 | 0.288 | 77% |
| 16 | 60% | 40% | 41.6 | 0.157 | 0.265 | 78% |
| 17 | 50% | 50% | 41.7 | 0.165 | 0.253 | 78% |
| 18 | 100% | 0% | 24.6 | 0.081 | 0.303 | 78% |
| 19 | 90% | 10% | 23.8 | 0.085 | 0.281 | 79% |
| 20 | 80% | 20% | 24.9 | 0.093 | 0.268 | 79% |
| 21 | 70% | 30% | 24.5 | 0.094 | 0.261 | 79% |

The higher the porosity, the higher the peak power output within the subject battery. With such high results, theoretically, at least, the number of batteries necessary to accord the necessary power levels to run certain devices (such as automobiles, for instance) would be reduced through an increase in the available power from individual batteries. Such a benefit would be compounded with an effective air resistance barrier as well. The porosity of the inventive separator may also be controlled by the ratio of nanofiber to microfibers, the types of nanofibers, and also by post processing such as calendaring, as can be seen below.

Battery Separator Base Analysis and Testing

The test protocols were as follows:

Porosity was calculated according to the method in U.S. Pat. No. 7,112,389, which is hereby incorporated by reference. Results are reported in %, which related to the portion of the bulk of the separator that is filled with air or non-solid materials, such as electrolyte when in a battery.

Gurley Air Resistance was tested according to TAPPI Test Method T460, which is hereby incorporated by reference. The instrument used for this test is a Gurley Densometer Model 4110. To run the test, a sample is inserted and fixed within the densometer. The cylinder gradient is raised to the 100 cc (100 ml) line and then allowed to drop under its own weight. The time (in seconds) it takes for 100 cc of air to pass through the sample is recorded. Results are reported in seconds/100 cc, which is the time required for 100 cubic centimeters of air to pass through the separator.

Mean Flow Pore Size was tested according to ASTM E-1294 "Standard Test Method for Pore Size Characteristics of Membrane Filters Using Automated Liquid Porosimeter" which uses an automated bubble point method from ASTM F 316 using a capillary flow porosimeter. Tests were performed by Porous Materials, Inc., Ithaca, N.Y.

The air permeability of a separator is a measurement of the time required for a fixed volume of air to flow through a standard area under light pressure. The procedure is described in ASTM D-726-58.

Tensile properties, Gurley Air Resistance and Mean Flow Pore Size are shown in Table 3.

TABLE 3

Physical Properties of Battery Separator Materials

| Example | MD Tensile kg/cm² | CD Tensile kg/cm² | Gurley Air Resistance sec/100cc | Mean Flow Pore Size mm |
|---|---|---|---|---|
| 1 | 1407 | 1407 | 566 | 0.46 |
| 2 | 539 | 539 | 235 | 0.96 |
| 3 | 249 | 249 | 41 | 2.13 |
| 4 | 170 | 170 | 10 | 5.96 |
| 5 | 31 | 31 | 0.3 | 11.76 |
| 6 | 1015 | 1015 | 162 | 0.72 |
| 7 | 642 | 642 | 81 | 0.83 |
| 8 | 522 | 522 | 64 | 1.50 |
| 9 | 396 | 396 | 39 | |
| 10 | 289 | 289 | 20 | |
| 11 | 132 | 132 | 6 | |
| 12 | 1128 | 1128 | 218 | 0.61 |
| 13 | 778 | 778 | 153 | 0.71 |
| 14 | 579 | 579 | 94 | 0.79 |
| 15 | 419 | 419 | 46 | |
| 16 | 292 | 292 | 29 | |
| 17 | 201 | 201 | 12 | |
| 18 | 354 | 354 | 351 | 0.78 |
| 19 | 296 | 296 | 212 | 0.89 |
| 20 | 224 | 224 | 145 | |
| 21 | 161 | 161 | 79 | |

The inventive example thus shows a very small pore size mean, indicating a capability to permit a large number of recharge cycles for the subject battery. In addition, the ability to control the pore size is indicated by the change in pore size with the proportional change in the ratio of nanofiber and microfiber materials. This is a key advantage that is not present in any previous art, such that with this technology the pore size can be dialed in by the battery manufacturer depending on the requirements of the end user. Thus, a separator can be designed for a power tool or automotive application to have different characteristics from a rechargeable watch battery, cell phone or laptop computer.

The tensile properties in the examples given are isotropic, that is, the same in all directions, with no distinction between machine and cross directions. Comparative examples show tensile properties that vary considerably between machine direction (MD) and cross direction (CD) tensile strength. In general, nanofiber-based battery separators are quite weak. Thus, one advantage of the current invention is the tensile strength, which allows faster processing in battery manufacture, tighter winding of the batteries, and more durability in battery use. Such MD tensile strength is preferably greater than 250 kg/cm², more preferably greater than 500 kg/cm², and most preferably greater than 1000 kg/cm². The requirements on the CD tensile strength are lower, preferably being greater than 100 kg/cm², more preferably being greater than 250 kg/cm², and most preferably greater than 500 kg/cm².

As noted above, calendaring and an increased population of nanofibers relative to microfibers will reduce the overall pore size mean, even further, thus indicating, again, the ability to target certain measurements on demand for the inventive technology.

Test results for two comparative examples are given to show the state of the prior art. The first comparative (CE1) is an electrospun nanofiber example from U.S. Pat. No. 7,112,389, where example 4 is taken as a typical example for comparison purposes. The second comparative example (CE2) is Celgard 2325 membrane separator. The test results are from Polypore, the manufacturer, as reported on their product literature. The results reported for these materials are shown in Table 4, below.

TABLE 4

| | Comparative Results For Battery Separator Properties | | | | | | |
|---|---|---|---|---|---|---|---|
| | Conditioned Basis Wt | Caliper | Porosity | MD Tensile Units | CD Tensile | Gurley Air Resistance | Mean Flow Pore Size |
| Sample | g/m² | mm | % | kg/cm² | kg/cm² | sec/100 cc | mm |
| CE 1 | 28.5 | 0.091 | 73% | 25 | | 0.4 | 2.65 |
| CE 2 | | 0.025 | 39% | 1700 | 150 | 620 | 0.028 |

The isotropic properties of the inventive separator show the potential for even thinner materials to be made without compromising strength in either direction. Such a result permits lighter, thinner, and less expensive batteries with greater amounts of electrolyte present and, presumably greater surface area for electrodes for improved power generation as well. Furthermore, tensile strength is necessary for processing to prevent electrodes from touching as the battery electrodes are pressed into each other. The CE2 tensile strength is high in the machine direction (MD), but very low in the cross direction (CD). The CE1 MD tensile strength is very low, and was not reported in the CD, limiting the usefulness of the overall product from a manufacturing and handling perspective.

The lower the air resistance, the greater the available usable power within the battery and the lower the energy loss on recharging. As well, the effect of heat on the battery overall is reduced with reduced air resistance characteristics. The inventive example shows a relatively low result when compared, especially, to the CE2 Comparative. The CE1 Comparative is very low; however, in combination with the porosity and pore sizes, as well as the tensile strength measurements noted above, the drawbacks of such a battery separator are evident. The inventive technology provides a better overall effect from all perspectives. Additionally, with thickness control, as well as the amount of nanofibers present within the overall fabric structure, the air resistance of the inventive separator may be modified to a lower level more in line with the CE1 materials, further evincing the unexpectedly good and beneficial results accorded by the inventive technology employed herein.

Battery separators range in thickness from 15 microns to over 100 microns. With the high strength, it is likely that a sheet of 12 gsm can be made without difficulty, and calendaring can reduce the thickness such that the full range of useful sheet thicknesses can be made with this technology. For example, a sheet of 12 gsm may have a thickness equal to one half of the sheets made at 25 gsm, or approximately 40 microns. Calendaring or otherwise compressing the sheet may reduce this thickness by 50%, bringing the resultant thickness to 20 microns. Processing improvements may allow even thinner sheets to be made and compressed to even thinner sheets, all of which would be encompassed within the current invention.

Battery Formation and Actual Battery Testing Results

Figure 8:
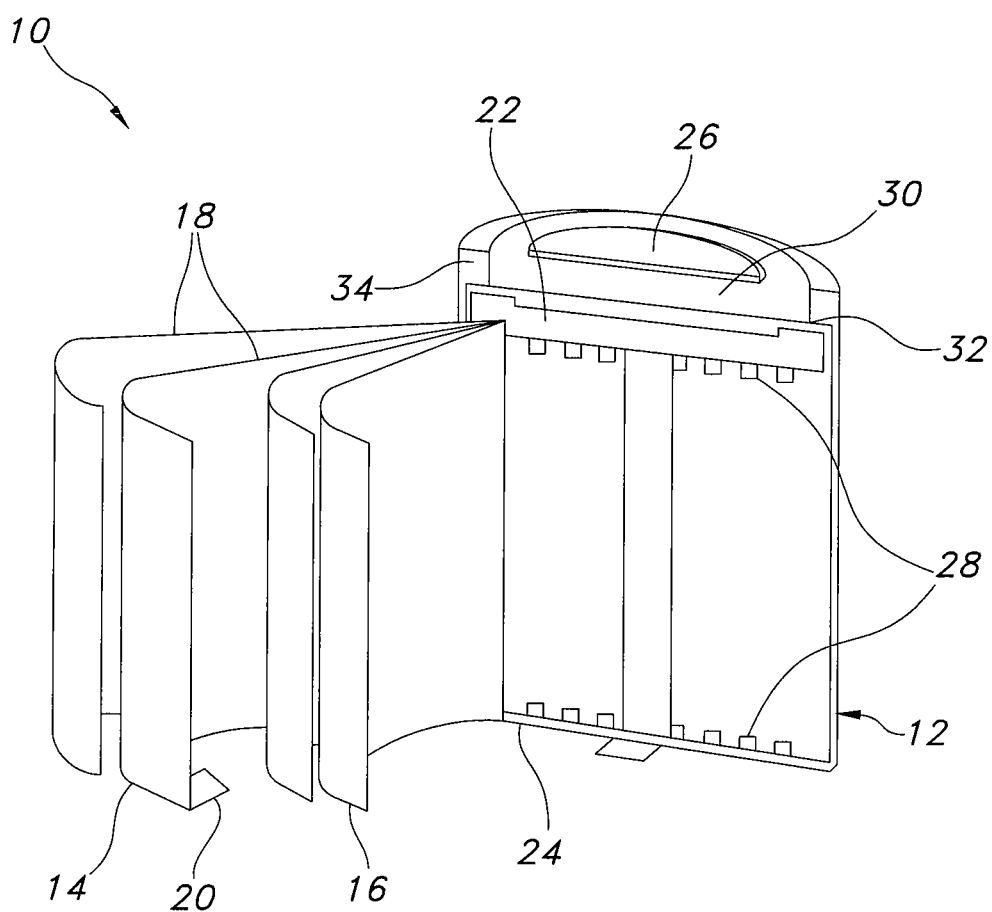
FIG. 8 shows an exploded view of an inventive rechargeable lithium ion battery including an inventive battery separator.

FIG. 8 shows one potential embodiment of a inventive battery 10 including the inventive separator 18 therein. The battery cell 10 includes a housing 12 within which all of the other components reside, securely sealed to prevent environmental contamination as well as prevent leakage of electrolyte from the cell. An anode 14 is thus supplied in tandem with a cathode 16, with at least one battery separator 18 between the two. Attached to the anode 14 is an anode lead 20 while a cathode lead 22 is attached to the cathode 16. The anode 14 is housed within an anode container 24 while the cathode is housed within a cathode cover 26. An insulator 28 is present to separate the anode 14 and cathode 16 from touching the housing 12 as well as the anode container 24 and the cathode cover 26. The cathode cover 26 includes a safety vent 30 with a gasket 32 present to allow for pressure within the cell 10. Lastly, a thermistor 34 is present around inner periphery of the housing 12. A liquid electrolyte is added to the cell prior to sealing to provide the necessary ion generation. The separator 18 thus aids in preventing contact of the anode 14 and cathode 16, as well as to allow for selected ion migration from the electrolyte therethrough. The general format of a battery cell follows this structural description, albeit with differing structures sizes and configurations for each internal component, depending on the size and structure of the battery cell itself. In this situation, coin cell batteries of substantially circular solid components were produced for proper testing of separator effectiveness within such a cell.

To that end, electrical properties of the separator were tested first by making symmetric lithium foil-separator-lithium foil 2016 coin cells and testing for electrical resistance, and then by making asymmetric carbon electrode-separator-lithium foil 2016 coin cells. Testing was done at the Nanotechnology Laboratory in the Georgia Institute of Technology School of Materials Science and Engineering. For the symmetric lithium-separator-lithium 2016 coin cells, ⅝" rounds were cut from selected separators, dried in a vacuum chamber of an Argon-filled glove box at 70° C. for approximately 12 hours and assembled into:

(a) symmetric lithium foil-separator-lithium foil 2016 coin cells and (b) asymmetric carbon electrode-separator-lithium foil 2016 coin cells.

The electrolyte used was 1 M LiPF6 in EC:DMC:DEC mixture (1:1:1 by volume). Lithium foil was rolled to thickness 0.45 mm and one or two layers of separator were used in this study. Celgard 2325 separator, CE2, was the specific comparative example for test purposes as well.

After 2 days of storage, the potentiostatic electrochemical impedance spectroscopy (EIS) measurements in the frequency range from 0.01 Hz to 100 kHz were carried out on each of the assembled two electrode Li-separator-Li coin cells.

Each cell included the following contributors to the total resistance: (i) Li ion transport in the electrolyte/separator; (ii) Li ion transport in a solid-electrolyte-interphase (SEI) layer on each of the Li electrodes; (iii) electron transport in Li/cell/contacts. Among these components of the resistance the (iii) electron transport can generally be neglected, while (i) Li ion transport in electrolyte usually give no semicircle in the present frequency region due to their high characteristic frequencies.

Being primarily interested in (i) Li ion transport in the electrolyte/separator, attention was centered on the high frequency region of the Nyquist plot associated therewith. The total resistance of the ion transport across the separator was approximated as the value of the Real part of the total resistance Z at high frequency where the imaginary component of the complex impedance becomes zero. As previously mentioned, the electrical resistance of the interfaces and the electrodes is much smaller than the ionic resistance and thus could be neglected.

The results of the AC EIS analysis are summarized in a Table 5 below. Ionic Resistivity is the resistance value of the electrolyte in the separator, and is calculated from the formula $Ri=I*A/t$, where Ri is the Ionic Impedance, I is the impedance in ohms, A is the area of the cell in square centimeters, and t is the thickness of the separator in centimeters. As can be seen, the Ionic Impedance of the cell can be reduced by >70% by using the proper combination of microfibers and nanofibers, as shown with a single layer of Example 19. In addition, by choosing the appropriate combination, the impedance can be dialed in to any number within a wide range of impedances. This ability to tune such properties is a key advantage of this invention.

TABLE 5

Battery Test Results

| Example | Separator | # layers | Impedance Ohms | Ionic Resistivity Ohm - cm |
|---|---|---|---|---|
| 22 | 18 | 1 | 3 | 733 |
| 23 | 18 | 2 | 7.5 | 916 |
| 24 | 19 | 1 | 2 | 466 |
| 25 | 19 | 2 | | |
| 26 | 12 | 1 | 6 | 1153 |
| 27 | 12 | 2 | 12 | 1153 |
| 28 | 13 | 1 | 9 | 1497 |
| 29 | 13 | 2 | 11.5 | 956 |
| 30 | CE2 | 1 | 2 | 1583 |
| 31 | CE2 | 2 | 4 | 1583 |

The ionic resistance of the separator/electrolyte layer was in the range of 2-6 Ohm per layer. Comparative study suggests that Examples 18 and 19 was very close to that of Celgard 2325 separator, CE2.

For asymmetric carbon electrode-separator-lithium foil 2016 coin cells, carbon electrodes were based on Pureblack® carbon and caboxymethyl cellulose (CMC) binder. Electrode composition is:
Pureblack®—88.85 wt. %
CMC (MM 250 kDa, DS 0.9)—11.15 wt. %
Prior to cell assembling the electrode was dried in vacuum at 100° C. for two days. The same type of electrolyte [1 M LiPF6 in EC:DMC:DEC mixture (1:1:1 by volume)] utilized above was introduced here as well. The results of the 1st Li insertion-extraction cycle collected at a slow rate of C/20 is presented in Table 6 below:

TABLE 6

Further Battery Testing

| Example | Separator Example # | Intercalation Capacity of 1st Cycle mAh/g | Deintercalation Capacity of 1st Cycle mAh/g | Coulombic Efficiency % |
|---|---|---|---|---|
| 32 | 18 | 511 | 193 | 37.69 |
| 33 | 12 | 489 | 184 | 37.68 |
| 34 | 19 | 339 | 156 | 46.04 |
| 35 | CE2 | 470 | 176 | 37.49 |

The capacity of the electrode and the Coulombic efficiency at the 1st cycle is similar for the cells with Examples 18, 12 and Celgard separator CE2. At a moderate rate, then, the inventive separators provided effective and similar results to the anisotropic Celgard materials. In actuality, though, a 15% increase was noted by Example 34, far above any expectation regarding performance of such a separator. Thus, the overall inventive materials are either similar to and exceed the performance of the standard used in the industry as of today.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What we claim is:

1. A polymeric battery separator comprising a nonwoven combination of microfibers and nanofibers, wherein said nanofibers exhibit an average diameter of less than 1000 nm, wherein said microfibers exhibit a diameter greater than 3000 nanometers, wherein said microfibers are cut to lengths of at most 1 inch, wherein said combination of microfibers and nanofibers are present as a single layer within said separator, and wherein said separator provides sufficient porosity for electrolyte ion transfer therethrough and suitable prevention of electrode contact when present within a battery.

2. The battery separator of claim 1, wherein said nanofibers and microfibers intermingle such that at least a portion of said nanofibers reside in the interstices between said microfibers.

3. The battery separator according to claim 1, exhibiting a machine direction (MD) tensile strength greater than 250 kg/cm$^2$.

4. The battery separator according to claim 3, exhibiting a machine direction (MD) tensile strength greater than 500 kg/cm$^2$.

5. The battery separator according to claim 1, exhibiting a cross direction (CD) tensile strength greater than 100 kg/cm$^2$.

6. The battery separator according to claim 5, exhibiting a cross direction (CD) tensile strength greater than 250 kg/cm$^2$.

7. The battery separator according to claim 1, wherein said nanofibers exhibit a transverse aspect ratio of greater than 1.5:1.

8. The battery separator according to claim 1, including islands-in-the-sea formed nanofibers.

9. The battery separator according to claim 1, exhibiting a mean flow pore size is less than 2000 nm.

10. The battery separator according to claim 1, exhibiting a thickness is less than 200 nm.

11. The battery separator according to claim 10, exhibiting a thickness is less than 100 microns.

12. The battery separator according to claim 2, exhibiting a machine direction (MD) tensile strength greater than 250 kg/cm2.

13. The battery separator according to claim 2, exhibiting a cross direction (CD) tensile strength greater than 100 kg/cm2.

14. The battery separator according to claim 2, wherein said nanofibers exhibit a transverse aspect ratio of greater than 1.5:1.

15. The battery separator according to claim 2, exhibiting a mean flow pore size is less than 2000 nm.

16. The battery separator according to claim 2, exhibiting a thickness is less than 250 microns.

17. The battery separator according to claim 1, wherein said separator is isotropic in terms of tensile strength in the machine direction and the cross direction and wherein said separator exhibits a machine direction tensile strength greater than 250 kg/cm2.

18. A battery, capacitor, supercapacitor, or ultracapacitor comprising a battery separator according to claim 1.

19. A method of generating electricity through the utilization of a battery of claim 18.

20. The battery separator of claim 1, wherein a least a portion of said nanofibers are fibrillated.

* * * * *